United States Patent [19]
Grummer et al.

[11] Patent Number: 6,047,308
[45] Date of Patent: *Apr. 4, 2000

[54] MODEM WITH INTEGRATED CONTROL PROCESSOR AND DIGITAL SIGNAL PROCESSOR SESSIONS

[75] Inventors: Grant Grummer, Sudbury, Mass.; Bruce Osler, Hudson, N.H.; Frank O. Voellmann, Acton; Kelly Clifford, Stow, both of Mass.; Douglas E. Green, Eliot, Me.; Kenneth D. Jones, Atkinson, N.H.

[73] Assignee: Cisco Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/896,692

[22] Filed: Jul. 18, 1997

Related U.S. Application Data
[60] Provisional application No. 60/022,812, Jul. 25, 1996.

[51] Int. Cl.⁷ .................................................. G06F 13/00
[52] U.S. Cl. ............................................................ 709/200
[58] Field of Search .................. 364/DIG. 1 MS File, 364/DIG. 2 MS File; 395/200.3; 381/318; 370/294; 709/200

[56] References Cited

U.S. PATENT DOCUMENTS

| | | |
|---|---|---|
| Re. 33,900 | 4/1992 | Howson .................................. 370/105 |
| 4,438,511 | 3/1984 | Baran ........................................ 370/19 |
| 4,445,213 | 4/1984 | Baugh et al. .............................. 370/94 |
| 4,578,796 | 3/1986 | Charalambous et al. ................... 375/8 |
| 4,620,294 | 10/1986 | Leung et al. ............................. 364/900 |
| 4,679,227 | 7/1987 | Hughes-Hartogs ....................... 379/98 |
| 4,757,495 | 7/1988 | Decker et al. ............................ 370/76 |
| 4,884,285 | 11/1989 | Heynen et al. ........................... 375/25 |
| 4,922,534 | 5/1990 | Gorniak et al. .......................... 380/49 |
| 4,991,169 | 2/1991 | Davis et al. .............................. 370/77 |
| 5,276,739 | 1/1994 | Krokstad et al. ....................... 381/318 |
| 5,353,338 | 10/1994 | Nakano et al. ........................... 379/99 |
| 5,497,373 | 3/1996 | Hulen et al. ............................. 370/79 |
| 5,553,063 | 9/1996 | Dickson ................................. 370/294 |

OTHER PUBLICATIONS

Taylor, Kieran; "Analog and ISDN Access Is in the Cards"; Nov., 1995.

Silberschatz, Abraham, and Galvin, Peter B., "Operating System Concepts," Addison–Wesley Publishing Company, Fourth Edition.

*Primary Examiner*—Robert B. Harrell
*Attorney, Agent, or Firm*—Cesari & McKenna, LLP

[57] ABSTRACT

A modem for processing telephone calls includes a line interface for coupling the modem to a telephone line and a computer interface for coupling the modem to a host computer. A processor in the modem between the line interface and the computer interface receives signals running between the telephone line and the host computer. Both the signal processing session and the control processing session required to process the signals are implemented on the single processor.

11 Claims, 6 Drawing Sheets

| CP TASK CONTROL BLOCK |
| --- |
| |
| NEXT TASK POINTER |
| MACHINE STATE |
| REGISTER CONTENTS |
| UNIQUE CHARACTERISTICS OF THIS TASK |
| STANDARD I/O FUNCTION POINTER |
| FLAGS - CONFIGURATION INFO |
| MAIL ADDRESS |
| SOFTWARE STACK ADDRESS |

FIG. 5A

| SP BACKGROUND TCB |
| --- |
| |
| NEXT TASK POINTER |
| PREVIOUS TASK POINTER |
| MINIMAL MACHINE STATE |
| MINIMAL REGISTER CONTENTS |
| SOFTWARE STACK ADDRESS |

FIG. 5B

| SP FOREGROUND TCB |
| --- |
| |
| NEXT TASK POINTER |
| PREVIOUS TASK POINTER |
| COMPLETE MACHINE STATE |
| COMPLETE REGISTER CONTENTS |
| SOFTWARE STACK ADDRESS |

FIG. 5C

MODEM WITH INTEGRATED CONTROL PROCESSOR AND DIGITAL SIGNAL PROCESSOR SESSIONS

RELATED APPLICATIONS

This application is based on U.S. provisional application Ser. No. 60/022,812, filed Jul. 25, 1996, the disclosure of which is incorporated herein in its entirety by reference.

BACKGROUND OF THE INVENTION

Conventional modems typically include at least two separate processors. One of the processors is typically a digital signal processor which operates under the control of signal processing software to perform the signal processing tasks associated with incoming or outgoing telephone call data. The typical modem also includes a control processor which operates under the control of control processing software to perform control tasks, such as error correction, associated with the processing of incoming or outgoing telephone call data.

The signal processing required for a single telephone call is commonly referred to as a signal processing (SP) session, and the control processing required for a single telephone call is commonly referred to as a control processing (CP) session. In conventional modems, the SP and CP sessions are executed independently on their respective processors, with the individual processors interfacing with each other as needed.

SUMMARY OF THE INVENTION

The present invention is directed to a modem and a method which implement the control processor (CP) and signal processor (SP) sessions on a single processor. The modem and method of the invention process signals between a telephone line and a host computer. The modem includes a line interface over which the signals can be transferred to and from a telephone line. A processor coupled to the line interface receives the signals between the telephone line and the host computer. The processor performs both the digital signal processing (DSP) tasks and the control processing (CP) tasks associated with processing the signals between the telephone line and the host computer.

In one embodiment of the invention, the tasks performed by the processor are divided into task groups. In one embodiment, the task groups include foreground task groups and background task groups. A foreground task group is defined as a group of modem functions or tasks whose timing is critical and, therefore, whose execution must be completed once it is initiated. A background task group is defined as a group of modem functions or tasks whose execution can be delayed.

In one embodiment, each background task group is run as a loop. The processor enters a loop and performs the tasks in the loop continuously until some predefined event occurs. For example, the processor may continuously run a background loop during normal operation and then may switch to a foreground task group when an interrupt is received. The foreground task group can then be executed to service the interrupt, and then flow can return to the background loop that was interrupted.

In one embodiment, SP sessions are divided into a background task group (SP background) and a foreground task group (SP foreground). The CP session is run completely in a single background task group (CP background). In one configuration of this embodiment, during normal modem operation, the SP background loop is performed continuously. When an interrupt is received, flow switches to the SP foreground loop. To service the interrupt, the SP foreground task group is executed. Upon completion of the SP foreground, flow returns to the SP background loop.

In one embodiment, each time the SP foreground is executed, a counter is incremented. When the count reaches a predetermined value, upon completion of the present foreground task group, flow switches to the CP background task group. After the CP background is completed, flow returns to the SP background.

In one embodiment, while the CP background is being executed, if an interrupt is received, flow can switch back to the SP foreground. Under these circumstances, after the SP foreground is executed, flow returns to the CP background loop where it was interrupted.

In one embodiment, switching between foreground and background loops is facilitated by the use of blind memory switching hardware. In this embodiment, separate physical memory space is provided for the CP and SP program code and data storage. The switching hardware uses address and control lines from the processor and a page register to create unique control lines to keep the CP and SP spaces separate. By changing the page register, the processor is presented with a different set of program and data memory, depending upon the task group being executed. However, it appears to the processor to be in the same address range. The use of this memory switching hardware allows the processor to switch quickly between CP and SP task groups, thus increasing processing efficiency and modem speed.

In one embodiment, task groups are structured as linked lists of tasks. That is, each task points to a next succeeding task to be executed. Each task, upon completing execution, initiates the start of a next task. Before completion of execution, a task runs a "rescheduler" routine. The rescheduler saves only the essential context of the current task and sets up the context for the next task. This eliminates the need for a supervisory loop to drive events. As a result, considerable processing efficiency and resulting modem speed are realized.

The various features of the invention provide a modem which is capable of performance in accordance with the V.34 modem specification. Using background and foreground task groups with tasks linked to each other and also using the blind memory switching hardware to switch between CP and SP memory spaces allows the modem to implement both CP and SP sessions on a single processor. Hardware and software complexity are both substantially reduced, resulting in faster and more efficient operation than prior modems.

The subject matter of pending U.S. patent application Ser. No. 08/686,990, entitled "Apparatus and Method for Processing Multiple Telephone Calls," is incorporated herein in its entirety by reference, now U.S. Pat. No. 5,949,762.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasize instead being placed upon illustrating the principles of the invention.

FIG. 5A is an illustration of the contents of a control processing task control block.

FIG. 5B is an illustration of the contents of a signal processing background task control block.

FIG. 5C is an illustration of the contents of a signal processing foreground task control block.

DETAILED DESCRIPTION OF THE INVENTION

Figure 1:
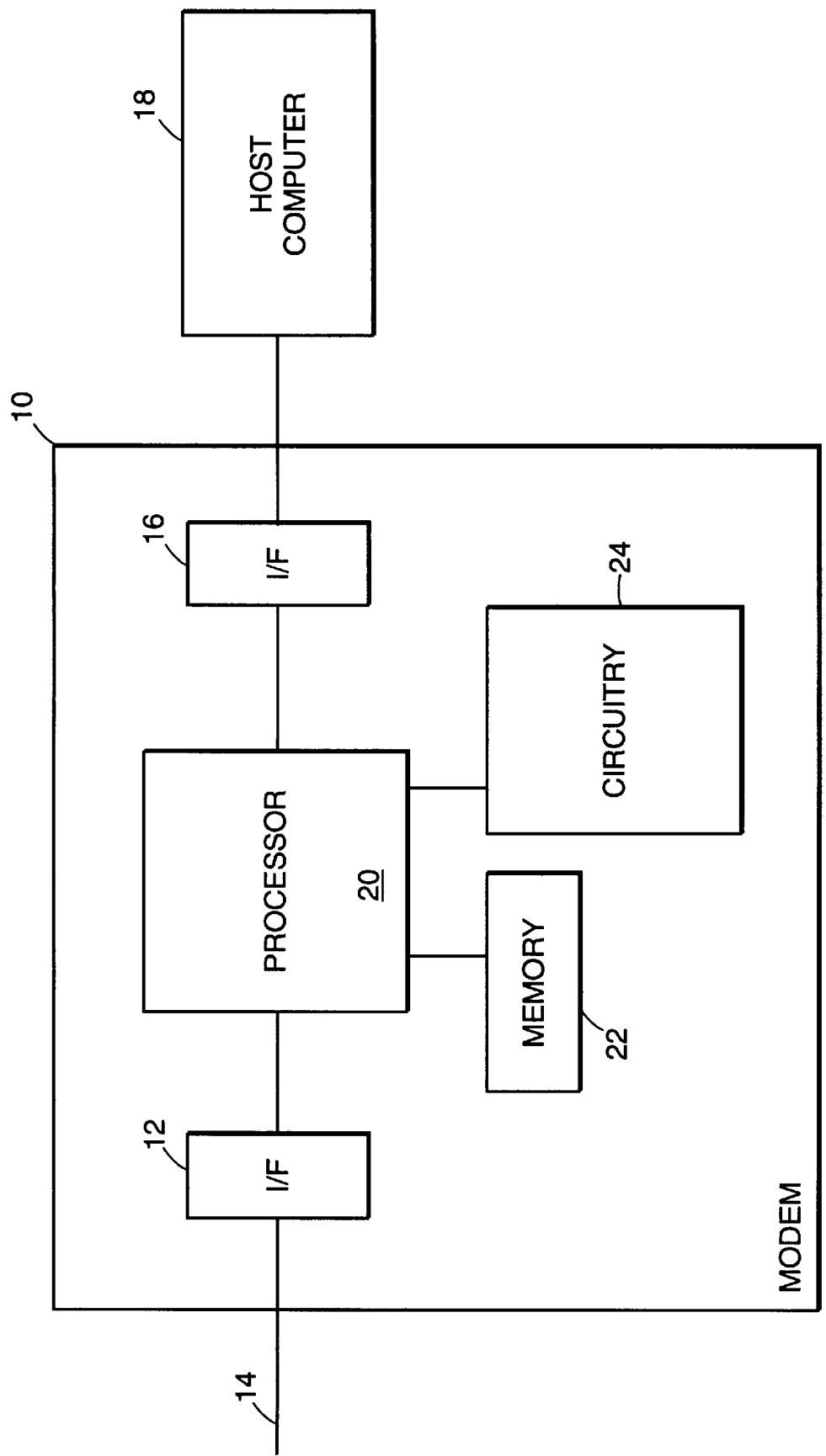
FIG. 1 is a top-level schematic functional block diagram of the modem of the present invention.

FIG. 1 is a schematic block diagram of the modem 10 of the invention. The modem 10 includes a line interface 12 which is coupled to a telephone line 14. The modem 10 also includes a host computer interface 16 which couples the modem 10 to a host computer 18. A processor 20 connected between the line interface 12 and the computer interface 16 processes signals running back and forth between the telephone line 14 and the host computer 18. The processor 20 works in conjunction with a memory 22 and associated circuitry 24 to process the signals. As described above, in accordance with the invention, the processor 20 implements both the signal processing sessions and control processing sessions required to process the signals.

Figure 2:
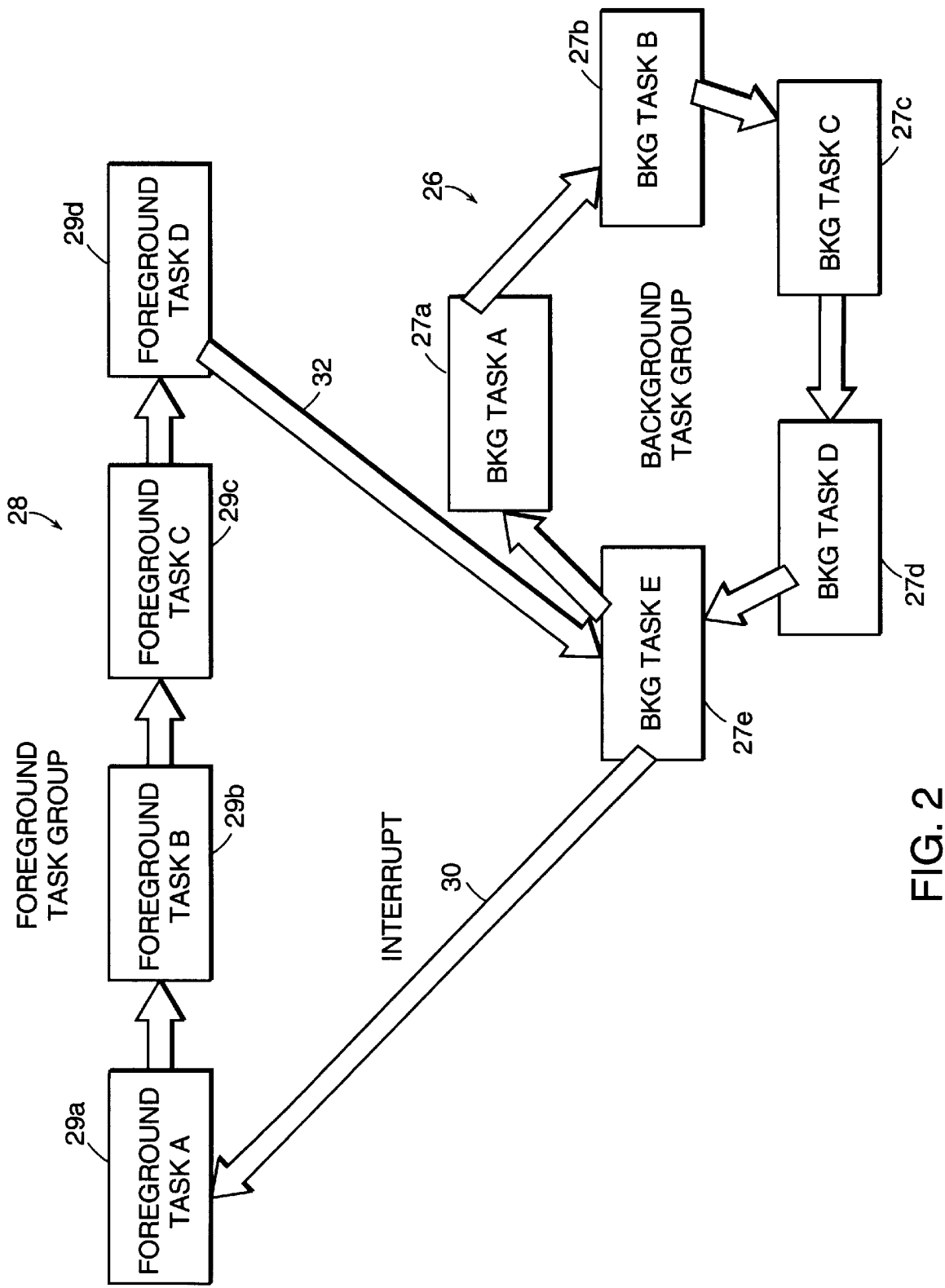
FIG. 2 is a schematic flow diagram illustrating execution flow for foreground and background task groups.

FIG. 2 contains a schematic flow diagram illustrating an example of the interaction between a foreground task group 28 and a background task group 26 as executed by processor 20 of the present invention to implement SP and CP sessions. The foreground task group 28 is shown in this example to include four foreground tasks A–D referred to by reference numerals 29a–29d, respectively. The background task group 26 is shown in this example to include five background tasks A–E, referred to by reference numerals 27a–27e, respectively.

In this example, the background task group 26 is a continuous loop. The tasks 27a–27e are executed in series, and each task is followed by a next succeeding task. Under normal operation, the processor executes the background task group or loop 26 repeatedly. Upon receipt of an interrupt, flow moves from the background loop 26 to the first task 29a of the foreground task group 28, as indicated by the flow arrow 30. Each of the foreground tasks 29a–29d is then executed in sequence to service the interrupt. After task 29d is completed, flow returns to the background task group 26 as indicated by flow arrow 32.

In this particular example, the interrupt occurred during the execution of background task 27e. After the interrupt was serviced by executing the foreground task group 28, the flow returned to task 27e of the background task group 26. Thus, flow continues in the background task loop 26 where it was interrupted.

Figure 3:
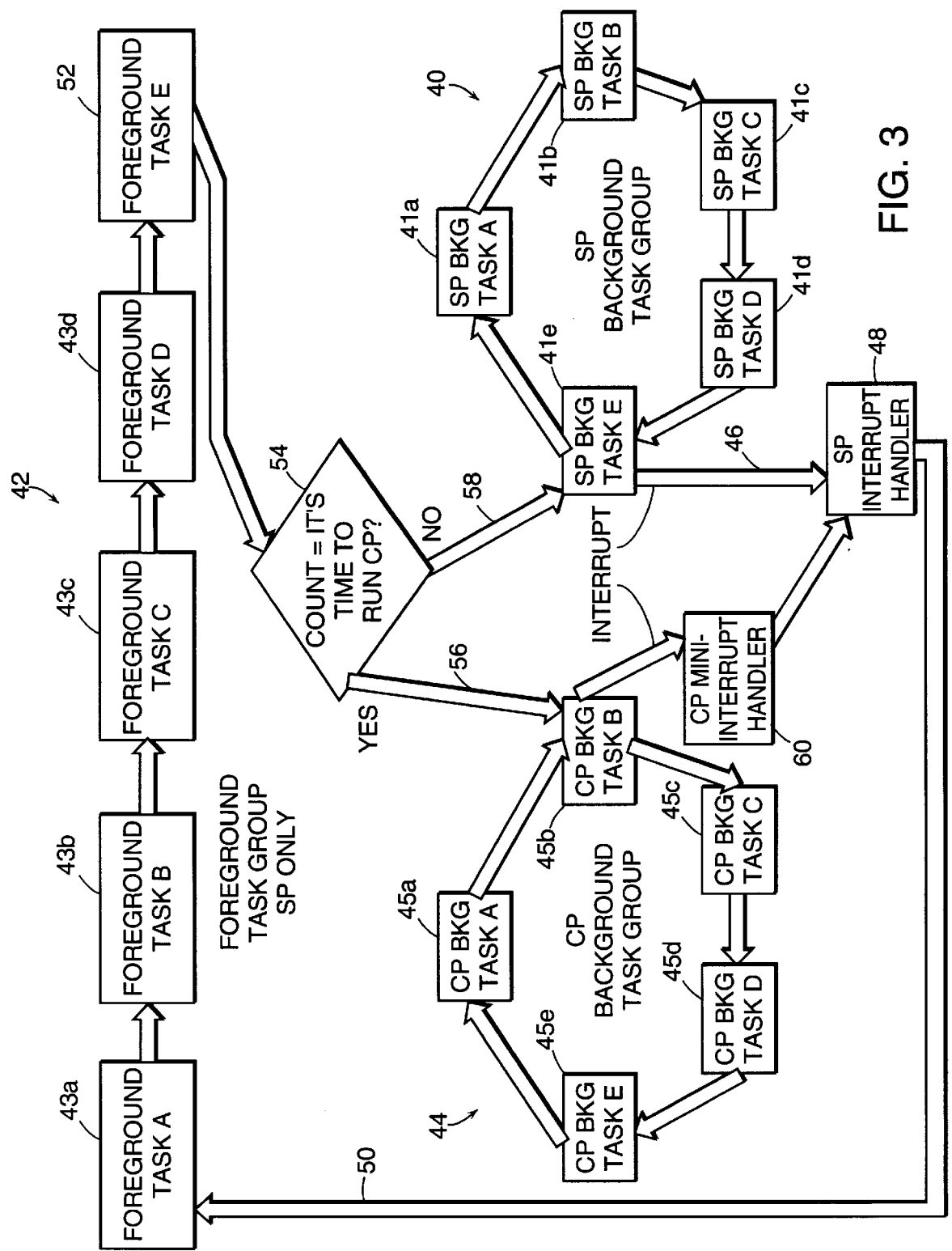
FIG. 3 is a schematic flow diagram illustrating execution flow for foreground and background task groups in one embodiment of the present invention.

FIG. 3 is a schematic flow diagram showing execution flow for one embodiment of the present invention. In this embodiment, the SP session is divided into a SP background task group 40 and a SP foreground task group 42. The CP session is run in a CP background task group 44. As described above, foreground refers to an urgent task group which must run to completion without interruption and do so in a fixed period of time. Background refers to a non-urgent task group which can be interrupted and need not be completed in a fixed period of time.

For example, in the present invention, the SP foreground 42 is used to service A/D and D/A converters and to generate signal samples for the converters. These tasks are urgent and are therefore run in the foreground because the converters operate at a fixed frequency. Failure to keep up with the converters results in signal distortion. Other tasks, such as mail processing, filter update calculation and other non-time-critical work is done in the SP background loop 40.

In this embodiment, the modem normally executes the background task group 40 repeatedly. The illustrative tasks A–E, referred to by reference numerals 41a–41e, respectively, are executed in series around the SP background loop 40. Execution of the foreground loop is triggered by an event such as a processor interrupt as shown by the arrow 46. Upon an interrupt, flow passes to the SP interrupt handler 48 which passes flow to the foreground task group 42 as shown by arrow 50.

After the foreground group 42, which is shown in this exemplary illustration to include four tasks A–D referred to as 43a–43d, respectively, is completed, a count is incremented in step 52 to keep track of the number of times that the foreground task group 42 has been executed. Flow then passes through to a decision step 54 which checks the count from step 52. If the count has reached a predetermined number, then it is determined that the CP background task group 44 must be processed, and flow continues along the "yes" branch 56 out of decision step 54. If the count has not reached the predetermined number, then flow travels along the "no" branch 58 back to the SP background task group 40. In this case, flow continues along the background task group 40 where it left off when the interrupt was received. In the example depicted in FIG. 3, background task 41e was being executed when the interrupt was received, and, therefore, flow out of the foreground task group 42 continues back into task 41e.

As mentioned above, when the count reaches a predetermined level, the CP background task group 44 is executed. As shown in FIG. 3, the CP background task group 44 can include five tasks A–E, referred to by reference numerals 45a–45e, which execute serially as shown. In one embodiment, the background tasks are executed one at a time in series repeatedly in a continuous loop until a processor interrupt is received. In another embodiment, the CP background 44 is executed once.

While the CP loop 44 is executing, upon receipt of an interrupt, flow out of the CP background task loop 44 proceeds to a CP mini interrupt handler 60 and then to the SP interrupt handler 48, which passes flow into the SP foreground task group 42. After the foreground task group 42 is executed, the count is again incremented in step 52, and flow passes through decision step 54 along arrow 58 back into the SP background task group 40 to the step that was being executed when the last interrupt was received which caused flow to leave the SP background loop 40.

As mentioned above, in one embodiment, the CP runs only one background task group. CP interrupt processing for UART and other functions does not spawn a foreground task group. It simply runs the one interrupt routine and returns to the previously running task in the task group.

To improve performance of the system, the invention performs an arbitration of the time allotted to each background task group. This is referred to as a preemptive operating system. This arbitration is accomplished by counting the number of times the foreground has run and returning to the appropriate background loop based on this count. This allows dynamic throttling of the ratio of processor time allotted to each background task group. System performance is improved by varying the ratio depending upon the job being performed by the modem at the moment. For example, during signal training, the SP requires more of the processor while the CP requires very little, since there is no data being passed through the modem. During this period, the SP background would therefore be allotted more processor time.

Another function performed by the system to improve speed and efficiency is duplication of a subset of the SP interrupt service routine in the CP program space. This is because the physical memory for the CP and SP are different. If the CP background task group 44 is running when the SP interrupt occurs, the CP executes the mini interrupt routine 60 to set up the appropriate context, and then changes the physical memory configuration as described below in connection with FIG. 4. If the SP interrupt occurs when the SP background loop 40 is running, there is no need to execute this procedure since the physical memory is already configured for execution of the SP code.

Figure 4:
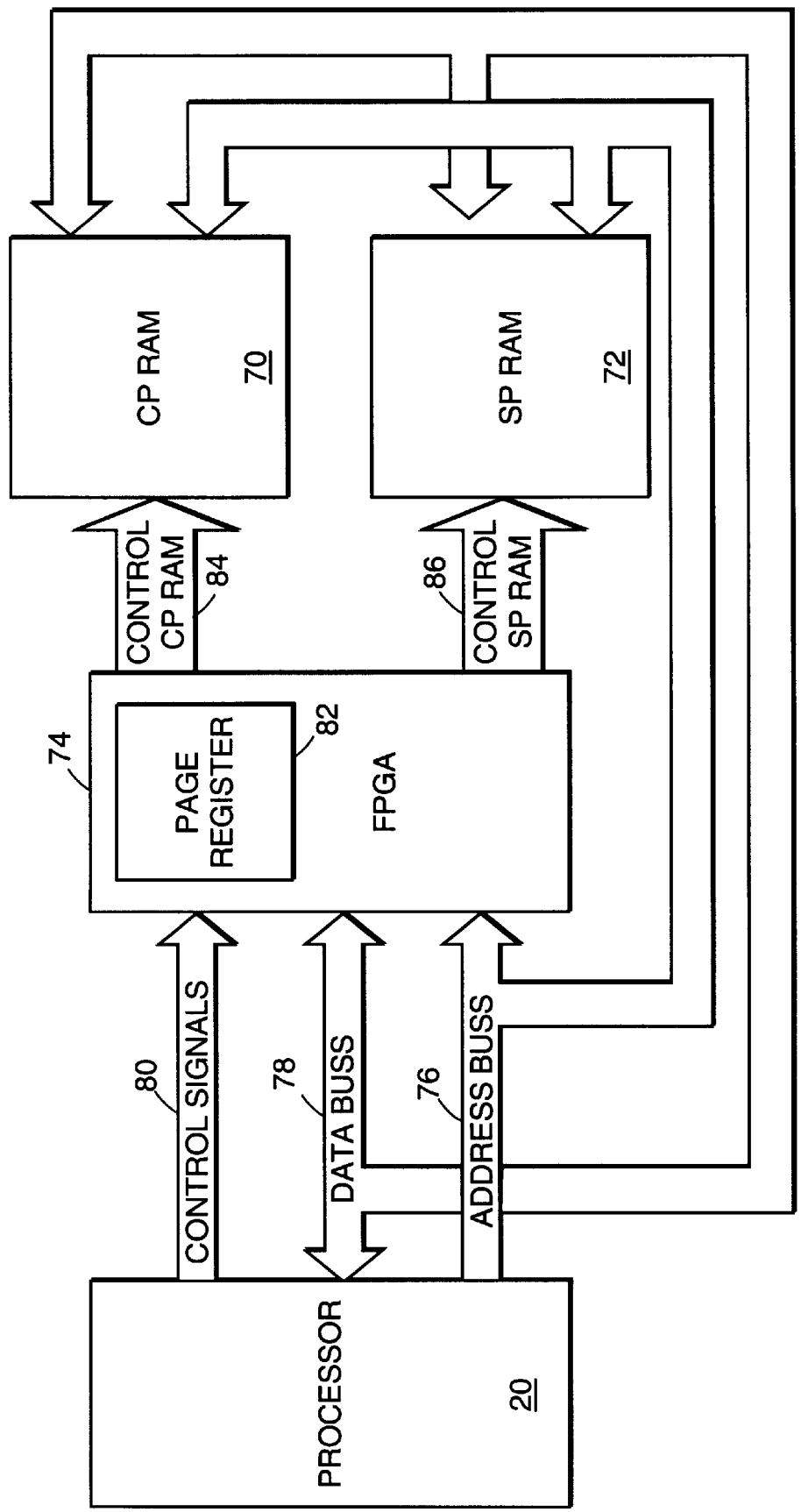
FIG. 4 is a schematic block diagram illustrating the blind memory switching hardware of the present invention.

FIG. 4. is a schematic block diagram showing the blind memory switching hardware of the invention. In one embodiment, the modem uses separate physical memory space for CP and SP program code and data storage. The memory space can include a CP RAM 70 and an SP RAM 72 as shown in FIG. 4. The memory switching hardware includes a programmable logic device such as the field programmable gate array (FPGA) 74. The FPGA 74 uses address lines 76, data lines 78 and control lines 80 from the processor 20 as well as a page register 82 inside the FPGA to create unique control lines 84 and 86 to keep the CP and SP spaces separate. This is particularly helpful for most commercial processors such as commercial DSPs, which tend to have limited addressing ranges. During operation, when a CP session is being performed, control lines 84 are active to access CP RAM 70, and control lines 86 are inactive. When a SP session is being performed, control lines 86 are active to access SP RAM 72, and control lines 84 are inactive.

When program flow changes from a SP session to a CP session, or vice versa, the page register 82 is changed to address a new page of memory. This results in the control lines 84, 86 used to access RAMs 70, 72, respectively, being toggled between the active state and the inactive state, depending upon the session, i.e., SP or CP, to which flow is being switched. For example, when flow switches from SP to CP, the page register 82 switches the address page such that control signals 84 become active, and control signals 86 become inactive.

This memory switching procedure is transparent to the processor 20. That is, regardless of the state of the page register and, therefore, the state of control lines 84, 86 and RAMs 70, 72, the address range used by the processor appears the same to the processor 20. Blind memory switching can also be implemented with a single RAM device.

An additional feature of the present invention is referred to as a Return Task Group Operating System (RTGOS). Under RTGOS, the execution of one task includes initiation of the execution of a next succeeding task. Each task has stored in memory a task control block (TCB) which contains configuration and state (context) information for each task. FIGS. 5A, 5B and 5C illustrate the contents of a CP TCB, a SP background TCB and a SP foreground TCB, respectively. As shown in FIGS. 5A–5C, each TCB includes a Next Task Pointer which points to the next task following the present task.

Upon entry to a task, the TCB is read to establish task context and to find out where the task can get further information. Prior to exit, the TCB is read to determine the next task to be run. TCBs can be manipulated by interrupt and mail routines to modify characteristics of a task. The linking of one task to the next is determined by a next task pointer in the current task's TCB. The linking of one task to the next and, thus, the sequence of task execution, can be changed by modifying the next task pointer in the TCB.

RTGOS is faster and more efficient than prior conventional operating systems. It is flexible in scheduling the order of execution of tasks without requiring a supervisory control program, which would require processor resources. A supervisory control program would also require several software decisions to determine whether to execute tasks.

RTGOS also streamlines CALL/RETURN overhead. A common operating system approach is to use a supervisory or executive loop to control the sequence of events. This loop CALLs the appropriate tasks in the appropriate order. An example of a common operating system approach follows:

---

Begin supervisory loop
Execute instructions
Call Task A      (machine saves context, jumps to execution of Task A;
                 Task A restores its own context, executes, saves A's
                 context, then jumps back to execution of supervisory
                 loop; machine restores context of supervisory loop)
Call Task B      (See Task A)
Execute other instructions
Call Task C      (See Task A)
Go to "Begin supervisory loop"
Task A might read as follows:

Restore Task A's context
Execute Task A instructions
Save Task A's context
RETURN

---

This method has at least two disadvantages. First, the sequence of events is hard coded into the program and is therefore inflexible. This can be overcome by inserting several decision points, i.e., IF (criteria), then CALL B. However, this decision adds overhead and requires the supervisory loop to have access to a multitude of variables. Also, complete reordering of tasks becomes very difficult using this method. Further, saving and restoring full context is time consuming.

In the present invention, as described above, each loop or task group runs as a collection of tasks, with each task running in its turn. RTGOS runs tasks in round-robin fashion, where a task, upon ceasing execution, initiates the start of a next task. Before completion of execution, a task runs a routine referred to as "rescheduler." Rescheduler saves only the essential context of the current task and sets up the context for the next task. Again, an advantage is the lack of need for a supervisory loop to drive events.

RTGOS streamlines context save and restoral operations which are needed when transitioning from execution of one task to the next. Many conventional programs use a CALL function to halt execution of a current task and spawn the execution of a new task. The operation involves automatic saving of the context of everything that is happening in the current task. This allows the task to resume operation at a later time without loss of context. When a CALLed task completes, it performs a RETURN function. This involves the automatic restoral of the previously saved context.

Saving contexts involves storing or PUSHing data onto the stack. The stack is a sequential heap of data in memory. Restoral involves retrieving or POPing data off the stack. CALLs PUSH data onto the stack PUSH and RETURNs POP data off of the stack. CALL and RETURN use the automatic saving and restoral mechanisms built into the microprocessor and can use excessive processor time saving and restoring unnecessary pieces of the task context.

---

In one embodiment, RTGOS works according to the following example.
Task A is running
Task A is ready to give up the processor to next task, Task B.
Task A saves only essential context in memory (not STACK)
Task A PUSHes some of TASK B's context, and its starting program memory address onto the STACK
RETURN (Return POPs Task B's starting program memory address and context)
Task B begins
Task B sets itself up using its Task Control Block (See FIGs. 5A–5C)
Task B is running
Check Mail (See "EVENT OCCURS")
Task B resumes
Etc.,
EVENT OCCURS
An external event, such as an interrupt or the receipt of Mail, spawns a specific task which can modify any task's TCB and thus modify the order of task execution. The interrupt and Mail routines are designed to avoid alteration of the currently running task's context. After service of the interrupt or Mail, the previously running task resumes. Tasks communicate with each other via Mail. The sending of mail and resulting actions are really what constitute the OS's ability to move the system program from one state (set and sequence of tasks) to another.

---

Figure 6:
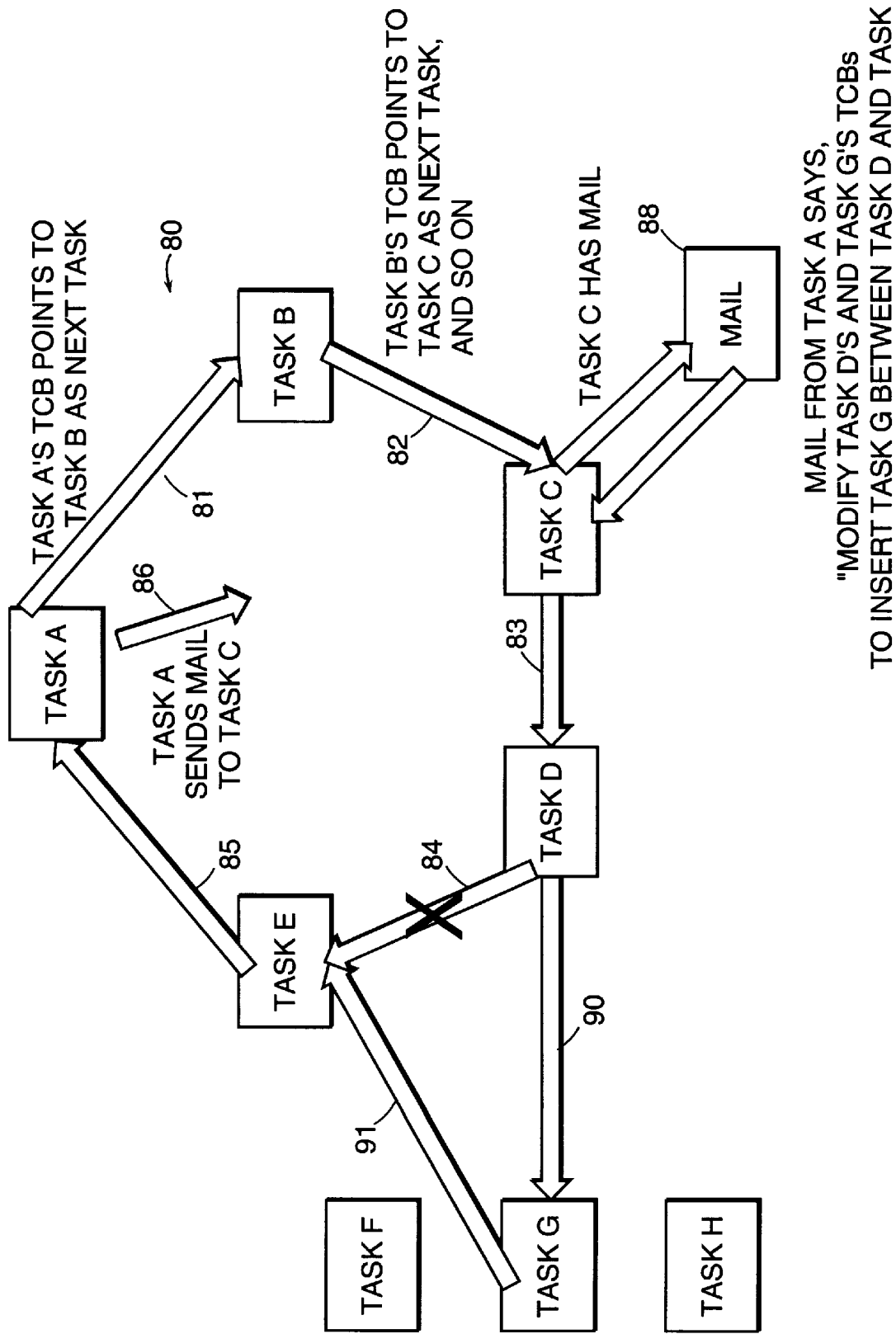
FIG. 6 is a schematic flow diagram illustrating execution flow for a group of tasks configured as a linked list of tasks in accordance with the present invention.

FIG. 6 is a schematic flow diagram illustrating an example of the use of linked tasks in accordance with the present invention. As shown in FIG. 6, tasks A–E are originally linked to be performed in succession to form a task loop 80. The arrows 81–85 illustrate the next task pointer for each task. That is, arrow 81 illustrates that task A's next task is task B; arrow 82 illustrates that task B's next task is task C; arrow 83 illustrates that task C's next task is task D; arrow 84 illustrates that task D's next task is task E; and arrow 85 illustrates that task E's next task is task A. As illustrated in FIG. 6, task A's TCB points to task B, task B's TCB points to task C, task C's TCB points to task D, task D's TCB points to task E, and task E's TCB points to task A. Thus, at the beginning of execution, the task group sequence is set up to be A, B, C, D, E, A, B, . . . .

As described above, tasks communicate with each other via mail. In the example of FIG. 6, it is decided during the execution of task A that the task group sequence should be modified. Accordingly, task A sends mail to task C as shown by arrow 86. In step 88, the mail is processed and determined to instruct C to modify task D's TCB and task G's TCB such that task G is inserted between tasks D and E.

In response, task D's TCB is modified such that its next task pointer points to task G. Additionally, task G's TCB is modified such that its next task pointer points to task E. As a result, logical flow directly between task D and task E is interrupted as indicated by the X through arrow 84. Instead, flow travels along arrow 90 to task G. After task G is executed, the flow continues along arrow 91 to task E.

Hence, program flow is controlled by each individual TCB associated with the individual tasks. This procedure eliminates the need for the supervisory loop and, therefore, substantially increases program efficiency.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of processing signals between a telephone line and a host computer comprising:

providing a line interface over which the signals can be transferred to and from the telephone line;

providing a processor that generates address signals representing addresses and is coupled to receive the signals from the line interface;

providing a selection module, operable by the processor between DSP and CP states thereof, that generates a selection-module output indicative of the selection module's current state;

providing a memory that includes separate DSP and CP memory spaces comprising respective memory locations commonly specified by the addresses that the address signals represent, the memory being responsive to the selection-module output to accord the processor access exclusively to the memory locations that the memory signals specify in the DSP memory space when the selection-module output indicates that the selection module is in its DSP state and to accord the processor access exclusively to the memory locations that the memory signals specify in the CP memory space when the selection-module output indicates that the selection module is in its CP state; and with the processor, operating the selection module alternately to its DSP-space and CP-space states and serially performing a set of digital signal processing (DSP) tasks associated with processing the signals while the selection module is in its DSP state and a set of control processing (CP) tasks associated with processing the signals while the selection module is in its CP state.

2. The method of claim 1 wherein the set of DSP tasks includes a group of DSP foreground tasks which must be completed and a group of DSP background tasks which can be delayed.

3. The method of claim 2 wherein the set of CP tasks includes a group of CP background tasks which can be interrupted.

4. The method of claim 3 wherein the group of DSP foreground tasks is performed upon interruption of the CP background tasks.

5. The method of claim 3 wherein the group of CP background tasks is performed after the group of DSP foreground tasks is performed a predetermined number of times.

6. The method of claim 2 wherein the group of DSP background tasks is performed during a normal mode of operation and the group of DSP foreground tasks is performed upon interruption of the group of DSP background tasks.

7. The method of claim 1 wherein the set of CP tasks includes a group of CP background tasks which can be interrupted.

8. The method of claim 7 wherein the set of DSP tasks includes a group of DSP foreground tasks which must be completed, the group of DSP foreground tasks being performed upon interruption of the group of CP background tasks.

9. The method of claim 1 wherein performance of each task in the sets of tasks includes initiating performance of a next task.

10. The method of claim 1 wherein the sets of DSP and CP tasks include a group of foreground tasks which must be completed and a group of background tasks which can be delayed.

11. An apparatus for processing signals between a telephone line and a host computer comprising:

a line interface over which the signals can be transferred to and from the telephone line;

a processor that generates address signals representing addresses and is coupled to receive the signals from the line interface;

a selection module, operable by the processor between DSP and CP states thereof, that generates a selection-module output indicative of the selection module's current state; and a memory that includes separate DSP and CP memory spaces comprising respective memory locations commonly specified by the addresses that the address signals represent, the memory being responsive to the selection-module output to accord the processor access exclusively to the memory locations that the memory signals specify in the DSP memory space when the selection-module output indicates that the selection module is in its DSP state and to accord the processor access exclusively to the memory locations that the memory signals specify in the CP memory space when the selection-module output indicates that the selection module is in its CP state;

the processor being so programmed as to operate the selection module alternately to its DSP-space and CP-space states and serially to perform digital signal processing (DSP) tasks associated with processing the signals while the selection module is in its DSP state and perform control processing (CP) tasks associated with processing the signals while the selection module is in its CP state.

* * * * *